United States Patent
Onaga

Patent Number: 5,862,404
Date of Patent: Jan. 19, 1999

[54] NETWORK DEVICE DISCOVERY AND STATUS INFORMATION DISTRIBUTION USING INDEPENDENT INFORMATION DISTRIBUTION PROCESSES

[75] Inventor: Tyson N. Onaga, Irvine, Calif.

[73] Assignee: Toshiba America Information Systems, Inc., Irvine, Calif.

[21] Appl. No.: 799,527

[22] Filed: Feb. 12, 1997

[51] Int. Cl.$^6$ ............................. G06F 13/14; G06F 13/20
[52] U.S. Cl. .................... 395/828; 395/835; 395/839; 395/200.53; 370/85.8; 370/95.2
[58] Field of Search ................... 395/828, 147, 395/835, 839, 200.53; 370/85.8, 95.2

[56] References Cited

U.S. PATENT DOCUMENTS

| | | | |
|---|---|---|---|
| 4,556,959 | 12/1985 | Allen et al. | 364/900 |
| 4,818,993 | 4/1989 | Stockel | 340/825.06 |
| 4,835,673 | 5/1989 | Rushby et al. | 364/200 |
| 4,839,793 | 6/1989 | Brunk | 364/200 |
| 4,897,781 | 1/1990 | Chang et al. | 364/200 |
| 4,941,084 | 7/1990 | Terada et al. | 364/200 |
| 4,974,199 | 11/1990 | Verbanets et al. | 364/900 |
| 5,007,013 | 4/1991 | Elms | 364/900 |
| 5,031,115 | 7/1991 | Hayashi | 364/519 |
| 5,084,875 | 1/1992 | Weinberger et al. | 371/291 |
| 5,109,486 | 4/1992 | Seymour | 395/200 |
| 5,119,493 | 6/1992 | Janis et al. | 395/650 |
| 5,123,089 | 6/1992 | Beilinski et al. | 395/200 |
| 5,214,772 | 5/1993 | Weinberger et al. | 395/575 |
| 5,220,674 | 6/1993 | Morgan et al. | 395/800 |
| 5,239,627 | 8/1993 | Beck et al. | 395/275 |
| 5,323,393 | 6/1994 | Barrett et al. | 370/85.8 |
| 5,537,550 | 7/1996 | Russell et al. | 395/200 |
| 5,537,626 | 7/1996 | Kraslavsky et al. | 395/828 |
| 5,550,957 | 8/1996 | Davidson, Jr. et al. | 395/114 |
| 5,631,847 | 5/1997 | Kikinis | 364/514 R |
| 5,633,999 | 5/1997 | Clowes et al. | 395/182.04 |
| 5,638,530 | 6/1997 | Pawate et al. | 395/442 |
| 5,682,514 | 10/1997 | Yohe et al. | 395/445 |

OTHER PUBLICATIONS

Marketing documents related to Ricoh Lan XP, Nov. 1996.
Marketing documents related to Canon GP 200F, Nov. 1996.
Marketing documents related to Canon GP 30F, Nov. 1996.
Marketing documents related to: Konica 7050, 7728, 9715FP, 9615FP, MD System, QScan Film Scanner, EV–Jet-color, Nov. 1996.
Multifunction Peripheral Interface Standard, Level 1 (MFPI–1) version 5.3 Apr. 9, 1996.

*Primary Examiner*—Thomas C. Lee
*Assistant Examiner*—Rehana Perveen
*Attorney, Agent, or Firm*—Steven C. Sereboff; Riva W. Bickel; Sereboff & Buyan, LLP

[57] ABSTRACT

In a networked system having workstations, file servers and intelligent peripheral devices, the intelligent peripheral devices are capable of determining information concerning their device status and communicating the device status information via a communications line. The file server obtains the device status information from the peripheral device and stores this information as a file readable by the workstations.

20 Claims, 6 Drawing Sheets

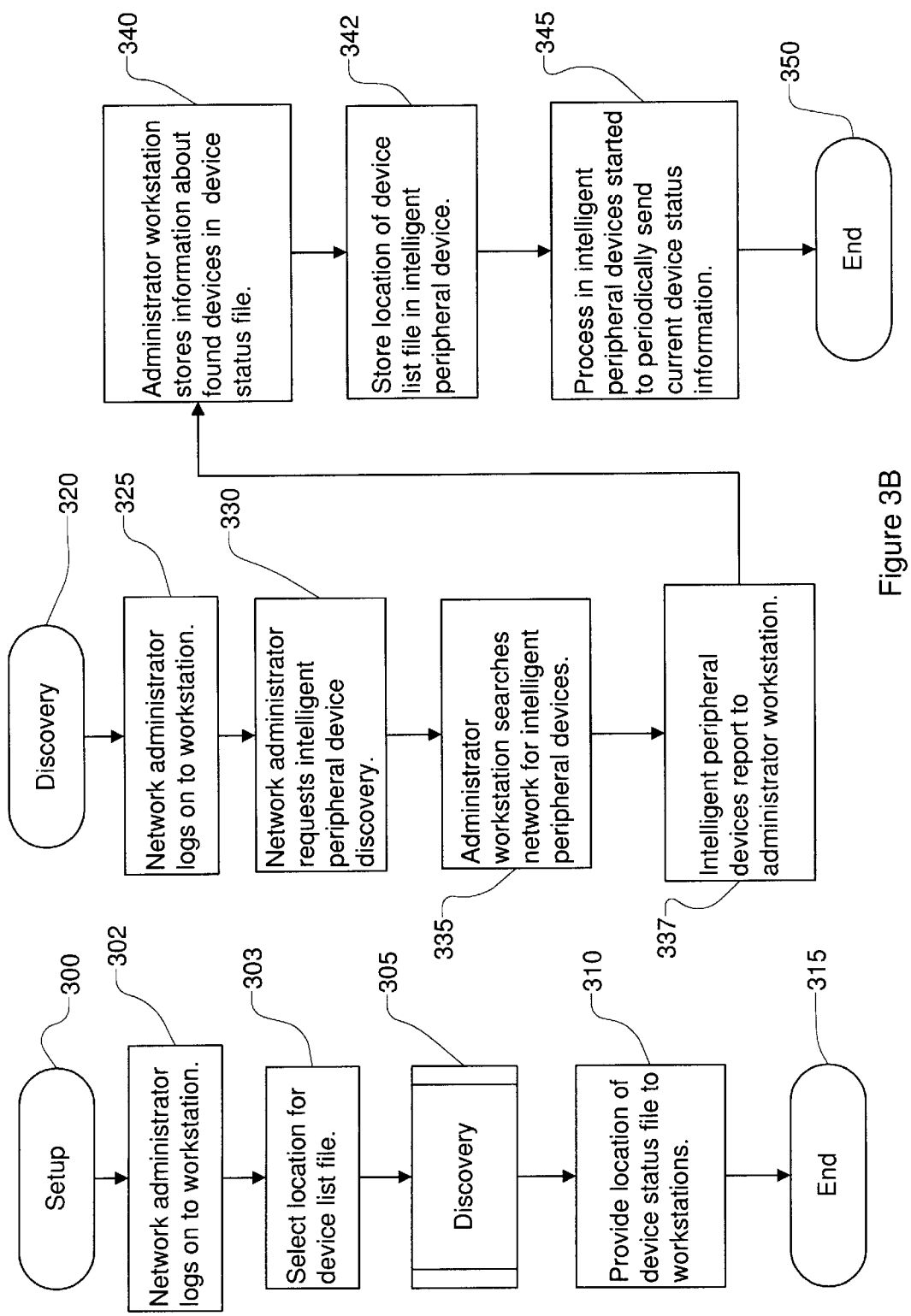

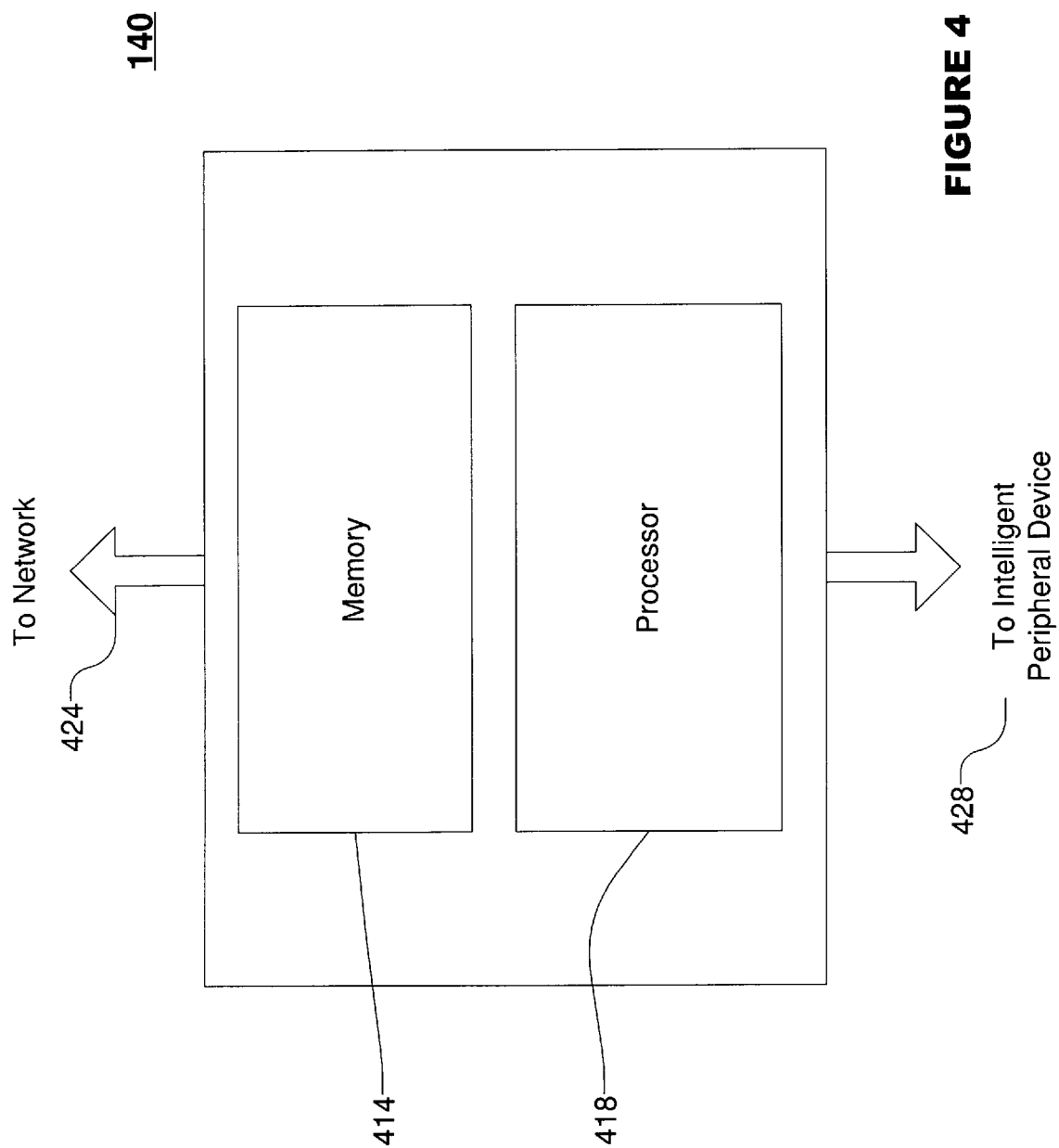

NETWORK DEVICE DISCOVERY AND STATUS INFORMATION DISTRIBUTION USING INDEPENDENT INFORMATION DISTRIBUTION PROCESSES

BACKGROUND OF THE INVENTION

1. Field of the Invention

The present invention relates generally to a system for providing peripheral device status information to workstations on a network.

2. Description of Related Art

In a typical networked multi-user computer environment, a number of individual workstations are linked together through a network, usually a local area network (LAN). Also linked on the LAN are one or more peripheral devices such as printers, facsimile machines, scanners or plotters. One or more file servers are also linked to the network and serve to manage allocation of the devices to workstations which request the use of the devices. The allocation procedures typically involve accepting requests, determining the address of the device requested, maintaining queues, establishing priorities and relaying data from the workstation to the device.

Typically when a workstation user wishes to determine the status of a device that is networked on a LAN, the method available depends upon the intelligence of the device. The earlier generation of peripherals were "unintelligent," or perhaps, better "uncommunicative." They accepted data from the LAN and processed it according to instructions, but were incapable of relaying status information back to the LAN. A workstation user, concerned about the status of a device to which he or she had sent a job, would have to leave the workstation to physically examine the device.

A server, such as a file server or a print server, might be able to provide some information regarding the status of a print job. However, this status information related to the status of the print job in a print queue, and the print queue was neither created, maintained nor serviced by the printer. If a print job was removed from the print queue, one could infer that the printer was handling the print job. However, the status of the print job as it was handled by the printer could not be ascertained. For example, absence of a print job from the print queue could mean that the print job was complete, or it could also mean that the printer had received the print job into its buffer and was still processing the print job.

More recently, peripheral devices such as printers have become available which are able to determine and relay information concerning their status through a communications port, such as a network interface card (NIC) or a printer (LPT) port. Thus, information concerning the printer's such as its device information (the manufacturer, command set and model of printer), the identity of the job it was currently processing, the status of its paper bins, ink supply, etc. which might be displayed on the printer's display panel, might be also relayed to a computer linked to the peripheral devices through a communications link. An example of this is the Lexmark Optra printer which provides identification data as well as other information as to status. However, querying the device and performing status checks slows the performance of the printer.

When numerous workstations are able to access an intelligent peripheral device through a network, the cumulative effect of their querying the peripheral device status repetitively is to significantly compromise the performance of the peripheral device. Such queries are also time consuming and make for inefficient use of network resources.

Furthermore, before the workstations can even access the peripheral devices, they typically perform a "discovery" operation. In performing discovery, a workstation searches the network for available peripheral devices. This discovery process can be quite burdensome to the network and can take a considerable amount of time. This burden is multiplied by the number of workstations on the network which perform discovery.

It is therefore an object of the invention to provide a system where workstations on a network can rapidly obtain information concerning the status of networked peripheral devices.

It is another object of the invention to provide a system where workstations on a network can rapidly obtain information concerning the status of networked peripheral devices without interfering with the performance of those peripheral devices.

It is still another object of the invention to provide a system wherein demand update of information concerning the status of networked peripheral devices is minimized so as to maintain device efficiency.

SUMMARY OF THE INVENTION

The previously described objects are achieved in a networked system having workstations, file servers and intelligent peripheral devices. The peripheral devices are capable of determining information concerning their device status and communicating the device status information via a communications line. Each interface control unit is associated with a given peripheral device and connected to the peripheral device via the communications line. The interface control unit obtains the device status information from the peripheral device and relays the device status information to the file server, where the file servers stores this information in a form readable by the workstations.

Still further objects and advantages attaching to the device and to its use and operation will be apparent to those skilled in the art from the following particular description.

DESCRIPTION OF THE DRAWINGS

These and other advantages of the present invention are best understood with reference to the drawings, in which, in varying detail:

FIGS. 3A, 3B, and 3C are flow charts of three processes in accordance with the invention.

FIG. 4 is a block diagram of a control unit in accordance with the invention.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
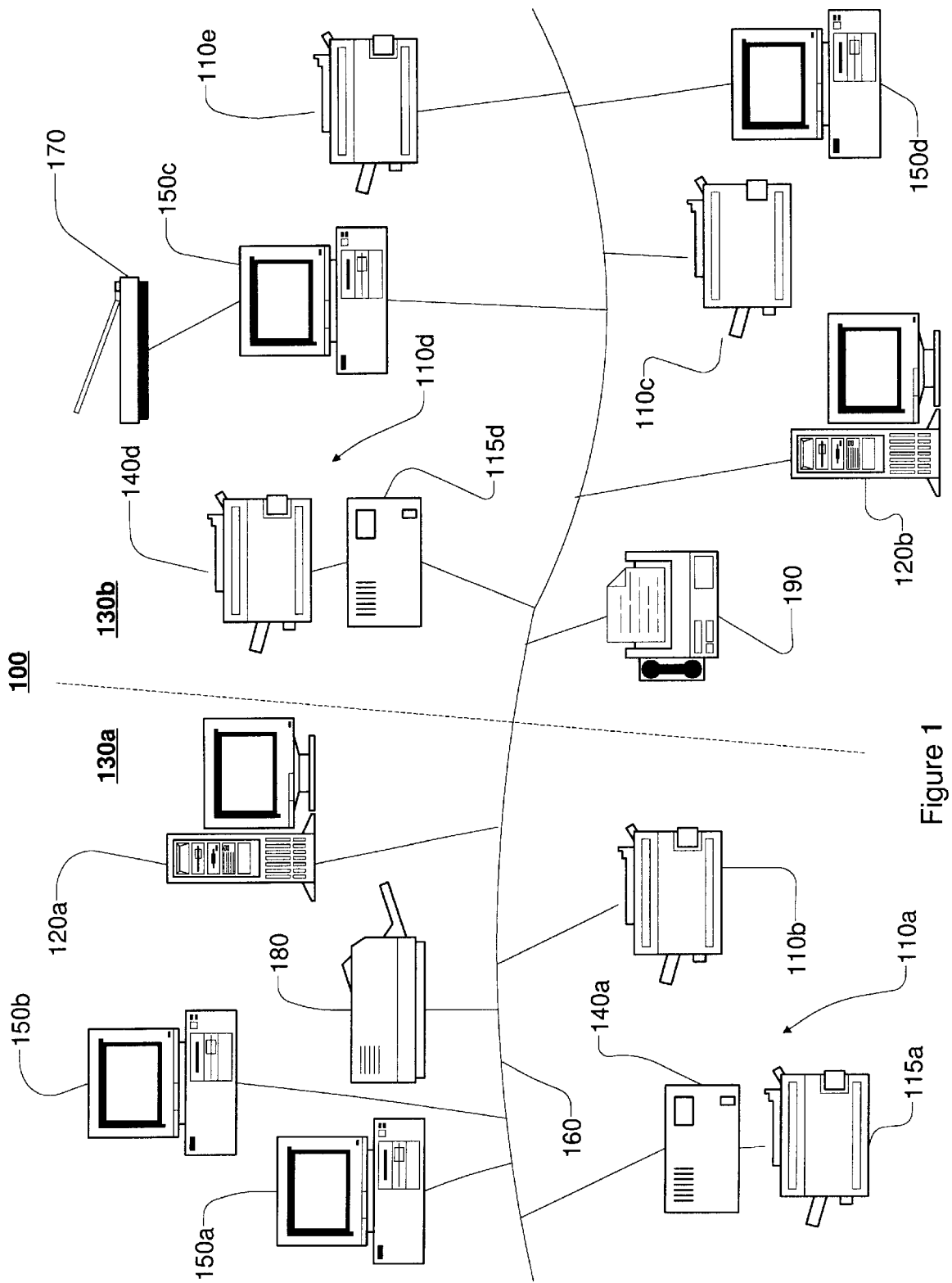
FIG. 1 is a block diagram of a computer network in accordance with the invention.

FIG. 1 shows a local area network (LAN) 100. To network communication lines 160 are coupled a number of workstations 150a, 150b, 150c, 150d. A number of file servers 120a, 120b also are coupled to the network communication lines 160. The network communications lines 160 may be wire, fiber, or wireless channels as known in the art Each workstation 150 is preferably logged on to a specific file server 120 as known in the art, and a workstation 150 may be logged on to multiple file servers 120. The network 100 may also include hubs, routers and other devices (not shown).

Figure 5:
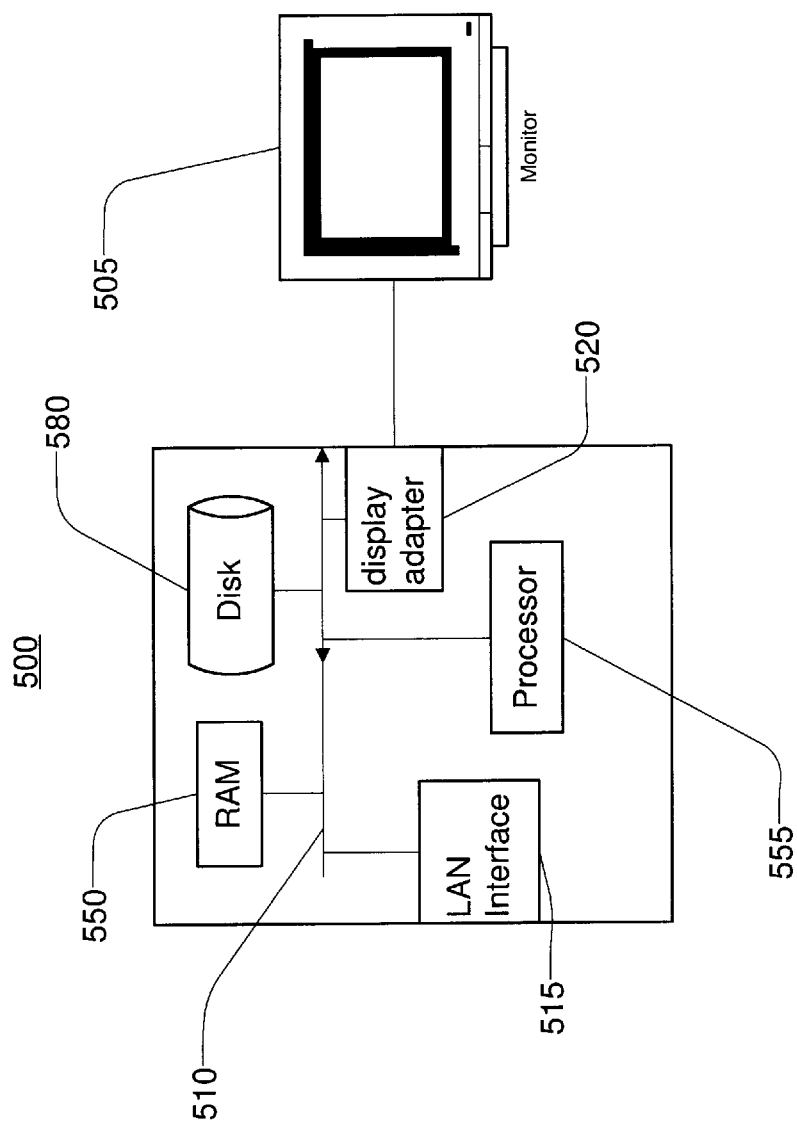
FIG. 5 is a block diagram of a general purpose computer.

FIG. 5 shows a general purpose computer 500 which is representative of the workstations 150 and file servers 120. The computer 500 preferably includes an Intel Corporation (San Jose, Calif.) processor 555 and runs a Microsoft Corporation (Redmond, Wash.) Windows operating system. In conjunction with the processor 555, the computer 500 has a short term memory 550 (preferably RAM) and a long term memory 580 (preferably a hard disk) as known in the art. The computer 500 further includes a LAN interface 515, a monitor 505, a display adapter 520 and a bus 510 as known in the art.

Before proceeding to describe the LAN 100, a few terms are defined. By "file server," it is meant a computer which controls access to file and disk resources on a network, and provides security and synchronization on the network through a network operating system. By "server," it is meant hardware or software which provides network services. By "workstation," it is meant a client computer which routes commands either to its local operating system or to a network interface adapter for processing and transmission on the network. A workstation may function as a server by including appropriate software, and may be for example, a print server, archive server or communication server. By "software" it is meant one or more computer interpretable programs and modules related and preferably integrated for performing a desired function. A "multifunction peripheral" is a peripheral which provides the functions of more than one peripheral, and typically provides printing and at least one of: copying, scanning and faxing.

By "intelligent peripheral device," it is meant a special purpose I/O processing device which is capable of relaying information concerning its current status via a communications line. Status information provided by an intelligent peripheral device preferably includes the intelligent peripheral device's unique network address, which job is currently being handled, how much of the job is completed, paper supply status, and ink or toner supply levels.

The LAN 100 includes a number of intelligent peripheral devices 110a, 110b, 110c, 110d, 110e and unintelligent peripheral devices 170, 180, 190. The intelligent peripherals shown include multifunction peripherals MFPs 110a, 110c, 110d and printers 110b, 110e, all preferably coupled directly to the network communication lines 160. The unintelligent peripherals shown include printer 180, network fax machine 190 and scanner 170. The printer 180 and network fax machine 190 are coupled to the network communication lines 160. The scanner is coupled to workstation 150c.

The unintelligent peripheral devices 170, 180, 190 cannot provide device status. They are limited, for example, to providing a buffer ready or buffer full signal, but cannot provide the type and quality of status information as an intelligent peripheral device.

MFPs 110a, 110d comprise a control unit 140 and a hard output unit 115. The control units 140a, 140d are coupled to the network communication lines 160. Preferably, the control units 140 are general purpose computers, having neither monitor, keyboard nor mouse, and running the Microsoft Windows NT operating system. The control unit 140, shown generally in FIG. 4 as 440, functions as a server to provide appropriate peripheral services to the workstations 150 and the file servers 120 on the network 100. The control unit 140 preferably includes a processor 418, memory 414, a communications link 428, such as a SCSI link to the hard output device 115, and a network link 424 such as a network interface card to the network communications lines 160. In combination with Windows NT, the control units 140 include software for initialization, configuration, network interfacing, hard output unit interfacing and device status.

Hard output devices 115 preferably comprise high speed copiers incorporating a communications adapter, such as a SCSI adapter, for communications with the control unit 140. Preferably, copying is performed by the hard output device 115 independently of the control unit 140. Preferably, for printing, the control unit 140 rasterizes the print job and the hard output unit 115 prints in a manner similar to a copy job. Preferably the hard output device 115 can also be used as a high quality scanner, with scan data being communicated to the control unit 140 for communication to the requesting network device (e.g., a workstation 150). Preferably the MFPs 110a, 110d also provide fax send and receive services, for example by incorporating a fax/modem in the control unit 140 and using the hard output unit 115 for printing incoming fax jobs and scanning outgoing fax jobs, as desired.

The LAN 100 shown is logically partitioned into two workgroups 130a, 130b, with the dashed line showing a logical partition of the workgroups. File server 120a provides network services to workgroup 130a and file server 120b provides network services to workgroup 130b. Members of a given workgroup 130 log onto the same file server 120 in order to facilitate file sharing and normally use only a subset of all the peripheral devices 110 available on the network. For example, workgroup 130a has access to peripheral devices 110a, 110b and 180. Workgroup 130b has access to peripheral devices 110d, 110e, 190 and 110c.

In accordance with the invention, three types of files are maintained on each file server 120. The first, called the "jobs file," stores a list of jobs being handled by one of the intelligent peripheral devices 110. Preferably, there is a jobs file for each intelligent peripheral device 110. The second, called the "device status file," stores device status information about the intelligent peripheral devices 110. Preferably, there is a device status file for each intelligent peripheral device 110. The third, called the "device list file," stores a list of the intelligent peripheral devices 110 and the location of the jobs file and the device status files for each of the devices.

The following description is made with respect to these three files. However, it is within the scope of the invention to provide a single file storing the information in the device list file, the device status file and the jobs file. This single file would include information regarding all intelligent peripheral devices in a workgroup or even an entire LAN. Furthermore, more than three types of files could be used. The important factor is that the device status information from the intelligent peripheral devices is stored in a central location from which all workstations obtain it. Another important factor is that discovery need be performed only once for all intelligent peripheral devices and all workstations.

The workstations 150, rather than querying the intelligent peripheral devices 110 for their status information, instead query the appropriate device status file stored on the relevant file server 120. The device status files are preferably updated with sufficient frequency to provide the workstations 150 with a reliable snapshot of the status of the intelligent peripheral devices 110. Preferably, each file server 120*a*, 120*b* maintains its own device status file and a set of jobs files and device status files. Preferably, for a given file server 120, its device list file lists all intelligent peripheral devices 110 on the LAN 100, but the file server 120 only stores jobs files and device status files for the intelligent peripheral devices 110 associated with that file server 120.

Figure 2:
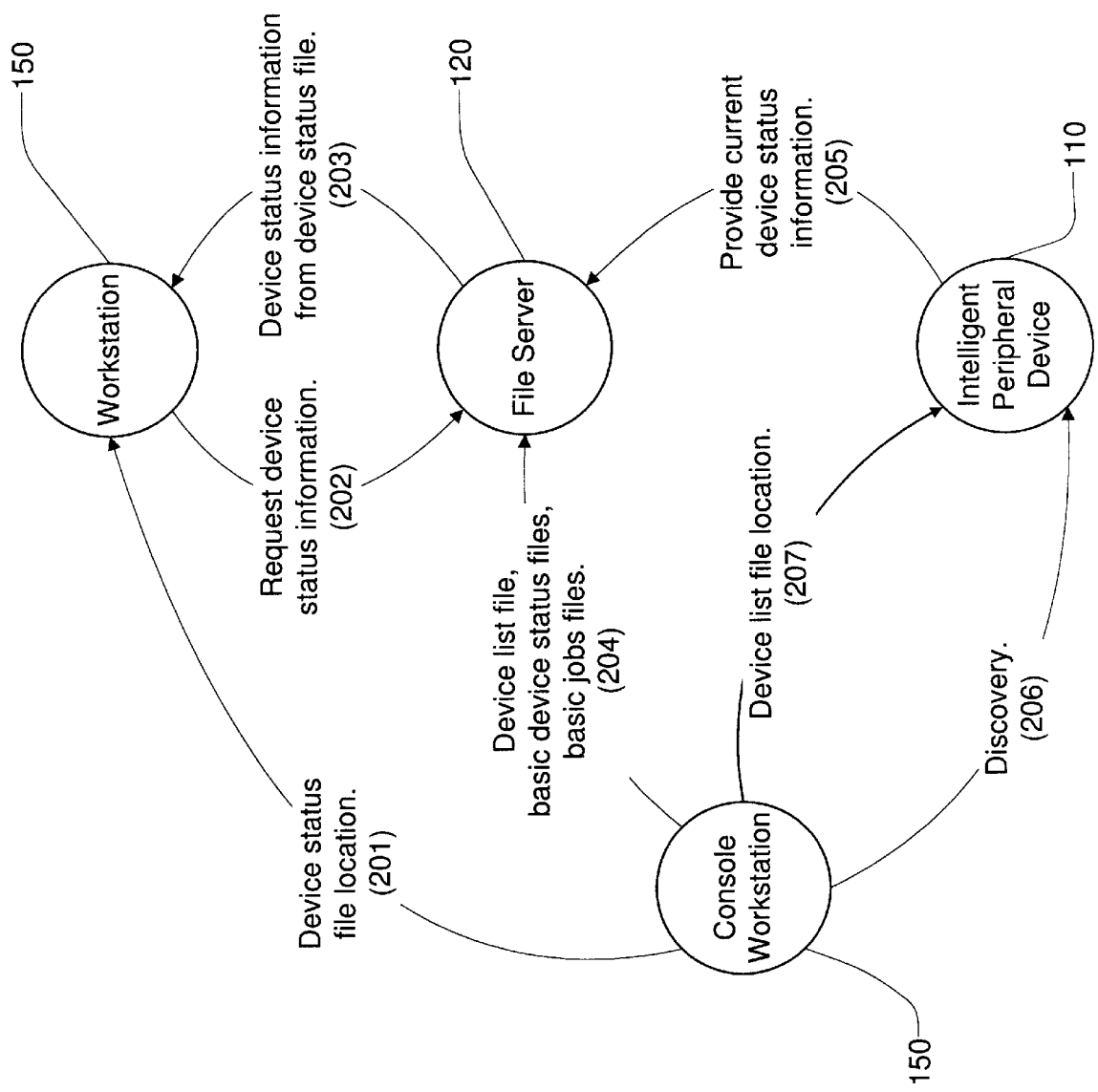
FIG. 2 is a data flow diagram of a computer network system in accordance with the invention.
Figure 3C:
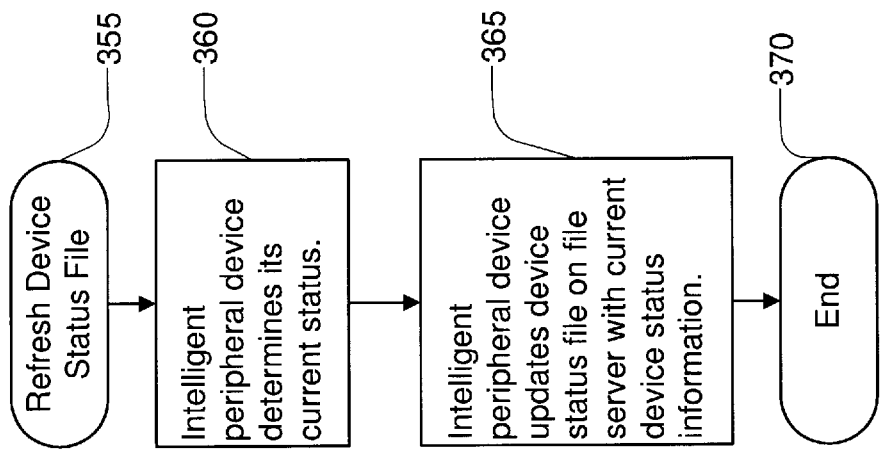

Three processes are primarily involved in the method of the invention. First, there is a setup process. Second, there is a discovery process which may be run with the setup process or later. Third, there is a status update process. FIG. 2 schematically shows the data flows in these three processes. FIGS. 3A, 3B and 3C are flow charts for these three processes.

Referring now to FIG. 3A, there is shown a flow chart for the setup process. In step 300, the process begins. Preferably, the setup process is embodied as software stored on one or both of the file servers 120 but which is run from one of the workstations 150. The setup software preferably includes security means and is run by a network administrator from a console workstation.

Next, the network administrator logs on to a workstation (step 302). The network administrator then selects a location on the file server 120 for storing the device list file (step 303). Next (step 305), the software in the administrator's workstation 150 performs discovery. This is shown as data flow 206 in FIG. 2. The discovery process is described more particularly below with respect to FIG. 3B. After discovery, in step 310, the network administrator provides the location of the device list file to the workstations 150. This is shown as data flow 201 in FIG. 2. This concludes the setup process.

It should be appreciated that steps 305 and 310 could be reversed. Also, the extent of discovery may depend upon the network administrator's security rights, and the nature of the network. Other storage schemes are possible and within the scope of the invention. It is not important whether the setup software is run once for each workgroup 130*a*, 130*b*, or a single time for more than one workgroup.

Furthermore, the device list files, device status file, and jobs files, although preferably stored in the file servers 120, could also be stored elsewhere in the network, such as in a workstation 150. Further still, there are many ways for the workstations 150 to obtain the location of the device status files. The inventors prefer that this information be provided automatically to each workstation 150 during the setup process as described. However, other methods are within the scope of the invention.

Referring now to FIG. 3B, there is shown a flow chart for the discovery process. In step 320, the process begins. Preferably, the discovery process is embodied as software stored on one or both of the file servers 120 but which is run from one of the workstations 150 by the network administrator. The discovery software preferably includes security means and is run by a network administrator from a console workstation.

Next, the network administrator logs on to a workstation (step 325). This step is unnecessary if discovery is being performed as part of the setup process, since the setup process includes a log on step (step 302). In step 330, the network administrator requests discovery of intelligent peripheral devices. Since this process is a relatively burdensome, the software preferably displays an appropriate warning.

The administrator's workstation then searches the network for intelligent peripheral devices (step 335). Alternatively, the discovery request could be relayed to the file server 120 which performs the searching step. After the intelligent peripheral devices 110 report to the administrator workstation (step 337), the information so obtained is relayed to the file server 120 and the device list file, status files and jobs files are created (step 340). This is shown as data flow 204 in FIG. 2. Logically, the device list file, device status files and jobs files are created by the network administrator's workstation. The particular method of creating these files is not critical to the invention and there is no preference. It is also at this point that the intelligent peripheral devices 110 are notified of the location of their respective device status files and jobs files (step 342). This is shown as data flow 207 in FIG. 2.

After the device list file, device status files and jobs files have been created, the software in the network administrator's workstation 150 preferably issues a command to the discovered intelligent peripheral devices 110 to start the process for updating the device status file (step 345). This process is shown more particularly in FIG. 3C. This ends the discovery process (step 350).

Preferably, the device list file, device status files and jobs files are created so that their contents are available to users at workstations 150. A process preferably embodied as software and resident in each workstation 150 is preferably provided for reading the device status file (data flow 202 in FIG. 2). After the file server 120 provides the device status information to the workstations 150 (data flow 203), the workstation 150 can display the device status information. Preferably, device status information is displayed in a tree control showing the peripheral devices 110 in the workgroup 130 as well as some status information for each such device.

Referring now to FIG. 3C, there is shown a flow chart of the process for refreshing device status files. As explained above, this process, preferably embodied as software in each intelligent peripheral device 110, is started after the intelligent peripheral device 110 has been discovered (step 355). Necessarily, the intelligent peripheral device 110 determines its current status (step 360). Next, in step 365, the intelligent peripheral device 365 updates the device status file on the file server 120 with its current device status information. This is also shown as data flow 205 in FIG. 2. Alternatively, and logically the same, the intelligent peripheral devices 110 could simply provide a data feed to the file server 120 which then updates the appropriate device status files. With the device status file updated, the process is complete (step 370).

A simple example of information that might be available concerning the intelligent peripheral devices 110 is shown in Table 1. This might be the name of the intelligent peripheral device 110, the unique network address of the intelligent peripheral device 110, and its status of being either up or down. If the status is down, the time in minutes that the intelligent peripheral device 110 has been unserviceable is available. Also, if the status is down, then information as to whether or not a network administrator has become notified of this situation is available. Additionally, the date/time stamp is maintained, showing when the intelligent peripheral device 110 was last checked. This information may be supplemented by all or part of whatever other information the intelligent peripheral device 110 is capable of determining and providing to the device status file.

TABLE 1

| Name | Location | Status | Time | Notified | Date/Time |
|------|----------|--------|------|----------|-----------|
| CM20 | My Server:\CM Devs\ . . . | Up | 0 | No | [date/time] |
| CM35 | YourServer:\CM Devs\ . . . | Down | 2 | No | [date/time] |
| CM50 | Their Server:\CM Devs\ . . . | Down | 4 | Yes | [date/time] |

Table 2 shows a simple example of the process of refreshing the device status file on server 120a. Each row of Table 2 corresponds to the state of the device status file at the point in time when the contents are refreshed by the intelligent peripheral devices 110a, 110b.

TABLE 2

| Device/Time | 110a | 110b |
|---|---|---|
| $T_0$ | Up,0,No | Up,0,No |
| $T_1$ | Up,0,No | Down,0,No |
| $T_2$ | Down,0,No | Down,10,No |
| $T_3$ | Up,0,No | Down,15,No |

At the first point in time $T_0$, both of the intelligent peripheral devices 110a, 110b are functioning. At the second point in time $T_1$, intelligent peripheral device 110b is down. In the device status file, intelligent peripheral device 110b sets the status flag for that device to "Down," Time to 0, and Notified to "No." At the third point in time $T_2$, intelligent peripheral device 110a is now down. In the device status file, it sets the relevant status flag to "Down," Time to 0, and Notified to "No." Intelligent peripheral device 110b is still down and it notes that ten minutes have elapsed. However, the network administrator, running software for reviewing intelligent peripheral device status, has been notified of the down state of intelligent peripheral device 110b. This software changes the Notified attribute to "Yes." Finally, at the fourth point in time $T_3$, intelligent peripheral device 110a is now running, and it resets its Status to "Up." Intelligent peripheral device 110b is still down and notes that fifteen minutes have elapsed.

The file server 120a may also include software for assisting in the maintenance of the device status file. For example, the file server 120a may have software providing a watch dog timer, wherein if one of the intelligent peripheral devices 110a, 110b fails to provide an update within a predetermined period of time, the file server 120a sets the status of the intelligent peripheral device 110a or 110b as, for example, "Down." Furthermore, since an intelligent peripheral device 110 which is down might not be able to update its status, software in the file server 120a may determine how long the intelligent peripheral device 110 has been down.

Members of one workgroup may from time to time need to use or view status information concerning the intelligent peripheral devices outside of their workgroup. For example, if all of the intelligent peripheral devices are down, or a particular function of a remote intelligent peripheral device is needed. Preferably, therefore, the device status file or another means on the file server 120a maintains a pointer to the device status file on the other file server 120b. It should be appreciated that this is merely a simple example, and more complex arrangements are within the scope of the invention.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A computer network system in which workgroup peripherals are efficiently administered, the computer network system comprising:

(a) a first general purpose computer including a no-volatile memory and software for storing device status information in a first device status file in the non-volatile memory;

(b) a first intelligent peripheral device associated with the first computer and communicatively coupled to the first computer by a computer network and including software for determining information concerning current device status of the first intelligent peripheral device and communicating to the first computer via the network the current device status information periodically for storage in the first device status file;

(c) a plurality of workstations communicatively coupled to the first computer by the computer network, the workstations including software for requesting the device status information stored in the first device status file, receiving the device status information and displaying the device status information;

the software in the intelligent peripheral device for determining information concerning current device status of the first intelligent peripheral device and communicating to the first computer via the network the current device status information periodically for storage in the first device status file independently of the plurality of workstations;

whereby device status information is efficiently communicated from the first intelligent peripheral device to the workstations.

2. A computer network system as set forth in claim 1 further comprising a second intelligent peripheral device communicatively coupled to the first computer by the computer network and including software for determining information concerning current device status of the second intelligent peripheral device and communicating to the first computer by the computer network the current device status information periodically for storage.

3. A computer network system as set forth in claim 2, the software on the first computer further for storing device status information from the first intelligent peripheral device in the first device status file and for storing device status information from the second intelligent peripheral device in a second device status file.

4. A computer network system as set forth in claim 2 wherein the device status information from the second peripheral is stored in the first device status file.

5. A computer network system as set forth in claim 2 wherein the first computer can provide the device status information for both the first intelligent peripheral device and the second intelligent peripheral device to the requesting workstation in response to the request.

6. A computer network system as set forth in claim 1 wherein, upon a request for an update made by a network administrator from one of the workstations, the first intelligent peripheral device can communicate to the first computer via the network the current device status information for storage in the first device status file.

7. A computer network system as set forth in claim 1 wherein at least one workstation includes software for discovering intelligent peripheral devices coupled to the computer network system.

8. A computer network system as set forth in claim 1 wherein the device status information comprises:
(a) a unique network address for the first intelligent peripheral device;
(b) whether the first intelligent peripheral device is up or down; and
(c) if the first intelligent peripheral device is down, how long it has been down.

9. A computer network system as set forth in claim 8 wherein the device status information also comprises, in an instance when the first intelligent peripheral device is down, whether a network administrator has been notified that the first intelligent peripheral device is down.

10. A computer network system a set forth in claim 1 further comprising:
(a) a second computer including software for storing device status information in a second device status file; and
(a) a second intelligent peripheral device associated with the second computer and communicatively coupled to the second computer by the computer network and including software for determining information concerning current device status of the second intelligent peripheral device and communicating to the second computer via the network the current device status information of the second intelligent peripheral device periodically for storage in the second device status file.

11. A computer network system as set forth in claim 10 wherein the second computer further includes a pointer to the first device status file on the first computer and accessible by the workstations.

12. A computer network system as set forth in claim 1 wherein the first intelligent peripheral device comprises a control unit and a hard output device, the control unit for interfacing between the hard output device and the first computer.

13. A control unit associated with a hard output device comprising:
(a) a first communication means for communicating with the hard output device and obtaining device status information from the hard output device;
(b) a second communication means for communicating with a file server linked to the control unit via a network, the file server having a non-volatile memory and providing services to a plurality of workstations linked to the file server via the network, the second communications means for relaying device status information with respect to the hard output device to the file server for storage in the non-volatile memory;
(c) memory resident software which, independently of the workstations, periodically polls the hard output device for device status information via the first communication means and relays the device status information to the file server via the second communication means; and
(d) memory resident software capable of accepting a device discovery request and responding to the device discovery request by periodically polling the hard output device for device status information via the first communication means and relaying the device status information to the file server via the second communication means.

14. The control unit as set forth in claim 13 wherein the first communication means is a SCSI line, the second communication means is a network interface adapter linking the control unit communicatively with a computer network, where the memory includes as resident a network operating system and software which provides initialization, configuration, network and peripheral device access, device status, and control and storage functions.

15. A method for providing to at least one workstation on a network status information concerning an intelligent peripheral device on the network, the method comprising:
in a first phase, performed independently of the at least one workstation;
(a) the intelligent peripheral device periodically determining its current device status;
(b) the intelligent peripheral device communicating its current device status to a first computer, wherein the first computer includes a non-volatile memory;
(c) the first computer storing the device status in a device status file in the non-volatile memory; and
in a second phase;
the at least one workstation on the network obtaining the contents of the device status file in the first computer.

16. The method of claim 15 wherein the device status file includes information comprising:
(a) a unique network address for the intelligent peripheral device;
(b) whether the intelligent peripheral device is up or down;
(c) if the intelligent peripheral device is down, how long it has been down; and
(d) if the intelligent peripheral device is down, whether a network administrator has been notified that the intelligent peripheral device is down.

17. The method of claim 15 comprising the additional steps of:
(a) a network administrator accessing the device status file and being notified if an intelligent peripheral device is down; and
(b) if an intelligent peripheral device is down, updating the device status file to reflect that the network administrator has been notified that the intelligent peripheral device is down.

18. The method of claim 16 comprising initialization steps of:
(a) a given workstation discovering the intelligent peripheral device on the network;
(a) creating a device status file on the first computer, the device status file including identifying information about the intelligent peripheral device;
(b) the first computer obtaining status information from the intelligent peripheral device; and
(c) writing the status information for the intelligent peripheral device in the device status file in the first computer.

19. The method of claim 18 including the additional step of a process resident in the network administrator's workstation warning the system administrator against performing discovery.

20. The method of claim 18 wherein the initialization steps are performed by a system administrator.

* * * * *